United States Patent
Bertrand

(10) Patent No.: US 7,340,462 B2
(45) Date of Patent: Mar. 4, 2008

(54) USER-CONFIGURABLE TERMINAL FOR DISPLAYING, RETRIEVING, INPUTTING AND PROCESSING DATA

(76) Inventor: Dominique Bertrand, 7, Limetree circuit, Mindaric Keys, West Australia 6030 (AU)

( * ) Notice: Subject to any disclaimer, the term of this patent is extended or adjusted under 35 U.S.C. 154(b) by 233 days.

(21) Appl. No.: 10/250,312

(22) PCT Filed: Dec. 28, 2001

(86) PCT No.: PCT/FR01/04227

§ 371 (c)(1),
(2), (4) Date: Dec. 18, 2003

(87) PCT Pub. No.: WO02/054197

PCT Pub. Date: Jul. 11, 2002

(65) Prior Publication Data

US 2004/0122821 A1 Jun. 24, 2004

(30) Foreign Application Priority Data

Dec. 29, 2000 (FR) .................................. 00 17318

(51) Int. Cl.
*G06F 7/00* (2006.01)
*G06F 17/30* (2006.01)
*H04L 9/00* (2006.01)

(52) U.S. Cl. ......................................... 707/9; 380/278

(58) Field of Classification Search ................ 380/228; 375/240; 701/3; 345/169; 713/156; 275/240; 455/426.1; 705/51

See application file for complete search history.

(56) References Cited

U.S. PATENT DOCUMENTS

| | | | |
|---|---|---|---|
| 5,590,193 A | 12/1996 | Le Roux | |
| 5,983,273 A | 11/1999 | White et al. | |
| 6,038,551 A | 3/2000 | Barlow et al. | |
| 6,055,314 A * | 4/2000 | Spies et al. | 380/228 |
| 6,128,338 A * | 10/2000 | Behaghel et al. | 375/240 |
| 6,278,913 B1 * | 8/2001 | Jiang | 701/3 |
| 2002/0143705 A1 * | 10/2002 | Kaars | 705/51 |
| 2003/0167392 A1 * | 9/2003 | Fransdonk | 713/156 |
| 2005/0035950 A1 * | 2/2005 | Daniels | 345/169 |
| 2005/0085226 A1 * | 4/2005 | Zalewski et al. | 455/426.1 |

* cited by examiner

*Primary Examiner*—Don Wong
*Assistant Examiner*—Patrick Darno
(74) *Attorney, Agent, or Firm*—Young & Thompson

(57) ABSTRACT

A terminal for displaying, retrieving, inputting and processing data for the user comprises a central unit, a storage unit connected to the processor of the central unit, a storage unit, elements for communicating with a connection network with access/service provider, a connection interface with a peripheral, a display screen, a keyboard and electrical power. The terminal further comprises a storage unit with confidential access for personal data of a user, elements for identifying an authorised user and encryption/decryption elements. The identification elements are insertible in reading elements and comprise a processor, identification data storing elements, data encrypting/decrypting key generating elements.

18 Claims, 5 Drawing Sheets

USER-CONFIGURABLE TERMINAL FOR DISPLAYING, RETRIEVING, INPUTTING AND PROCESSING DATA

The present invention relates to computers and is more particularly concerned with machines applied to the field of personal management.

The appliances currently used in personal computing are called personal computers or PCs.

This type of equipment is provided in almost all cases with an operating system or OS.

This OS is generally "proprietary", this signifying that the vendor thereof does not give even partial access to his source code Such machines are made multipurpose to the point that their OSs are held by a very limited number of providers, if not by just one.

This penalizes the users who experience the following drawbacks:

- licence fees to be paid to the OS providers for each machine. Additionally, when changing machine, a new licence must also be taken for the corresponding software.
- all the application software operating on PCs also depends on the provider of the OS and upgrades thereof are imposed by the provider on the user who, if he does not adopt them, very quickly witnesses his machine becoming incompatible with the new updates of these OSs.
- The user is therefore trapped in an endless escalation. Through this practice, OS providers deliberately exploit the growth curve dubbed "Moore's law". The doubling of the power of PCs every 18 months in accordance with this law entails a change of machine and hence of its associated OS.
- in the case where the designer or designers of proprietary OSs do not propose the adaptation of this or that hardware to their OSs, the user also suffers as a result since he has to change hardware in order to benefit from these new OSs.

It is therefore clearly apparent that the current system of PCs leads users to a dependency with regard to OS providers, then to the increasing obsolescence of their equipment that is made more acute by the absence of competition.

It is also apparent that such a concept fixes the limits of users who are trapped by these providers of proprietary OSs, this moreover preventing the development of more varied and more flexible standards.

Finally, current PCs possess no mode of metering the computational power of the microprocessor as a function of the requirements needed by the user.

This entails a considerable extra consumption of energy and consequently a more considerable volume and weight of the equipment, lesser autonomy and reduced mobility.

The invention aims to remedy the aforesaid drawbacks of the known computing hardware by creating an appliance which while being of reduced cost price relative to conventional PCs, exhibits markedly superior performance than that of the known hardware.

The aim of the invention is to be able to use any terminal whatsoever, independently of its upgrades.

The aim of the invention is also to produce an appliance making it possible to dispense totally with the use of an OS such as is used in a PC.

Its subject is therefore a terminal for displaying, retrieving, inputting and processing data for user comprising a central unit, a memory unit connected to the processor of said central unit, a memory unit for the applications to be implemented by the terminal, means of communication with at least one network for linking with at least one access/services provider, at least one interface for linking with at least one peripheral, a screen, and a keyboard and energy supply means, characterized in that it further comprises a memory unit with confidential access for the personal data of at least one user, means of identifying at least one authorized user and means of encryption/decryption, said identifying means being insertable into reading means and comprising a processor, means of storing data identifying said at least one user, means of generating for each user a data encryption/decryption key, means of configuring the terminal as a function of the requirements of each user in terms of applications available on the network and said encryption/decryption means cooperating with said key so as to encrypt and decrypt data and/or applications exchanged between the network and said user and/or the data and/or the applications contained in the memory unit with confidential access.

According to other characteristics of the invention:

- it comprises data compression/decompression means;
- the information identifying said at least one user comprises the surname and forename, the address of the user, as well as his bank details of the user;
- the means of identifying said at least one user comprise a personal chip card insertable into a chip card reader and the keyboard associated with said screen with a view to the entry of the personal code of each user;
- said encryption/decryption means are carried by the personal chip card;
- the chip card comprises a controller linked to a bus to which are linked the processor, the means of storing the data personal to the user, a system for determining the configuration in which the user wishes to operate the device, a modifiable algorithm for computing the key for encrypting/decrypting the data and/or the applications exchanged between the terminal, the network and the storage unit with confidential access;
- it comprises additional means of identifying the user through the latter's anthropometric information and means of combining parameters corresponding to said anthropometric data with the data used by the algorithm for computing said encryption/decryption key;
- said personal chip card furthermore comprises linked to its bus, a multi-user management system making it possible to render the chip card usable by several entitled persons;
- the degrees of entitlement of the users are different and make it possible to access applications that the terminal is capable of providing and which are authorized by the degree of entitlement of the corresponding user;
- said personal chip card furthermore comprises linked to said bus, a system for indicating the programs installed in the terminal, these programs being downloaded into the terminal or available on the network to which said terminal is linked and thus defining the environment of a specified user;
- it comprises associated with the central unit, input/output interfaces for the audio signals, for the video signals and for a scanner;
- the means of communication with said at least one access provider network comprise a controller linked to the central unit and to which are linked an infrared interface, a wire interface and an HF interface;

it furthermore comprises a controller of universal computerized inputs/outputs allowing it to be linked to peripherals and to the network;

it furthermore comprises a device which meters its energy supply means and its working frequency as a function of the instantaneous computational power which is necessary for it;

said energy adaptation device comprises linked by a bus to the processor of said central unit, a clock generator and a fixed voltage converter, connected to an electrical supply source of fixed voltage, said fixed-voltage converter being in turn connected to a programmable-voltage converter controlled by the processor and supplying the kernel of the processor, said clock generator being furthermore linked to the processor in such a way as to supply the latter with signals of frequency f(RAM), f(bus), f(core up) corresponding to the computational power requirements of the RAM memory associated with the processor and of the kernel of said processor;

the applications, on the one hand exchanged between the network and said user, and on the other hand stored in the terminal are of the unrestricted software type;

associated therewith is at least one site for storing data and/or applications which belong to said at least one network and which are intended to contribute to the formation of the operating environment of the terminal;

the personal chip card of a user can be withdrawn from a first terminal and inserted into another terminal to allow said user to access from said other terminal the operating environment created for him with the aid of the first terminal and thus to transform said other terminal while it contains said personal chip chard of said user, into a virtual terminal for the latter.

The invention will be better understood on reading the description which follows, given merely by way of example and while referring to the appended drawings, in which.

Figure 1:
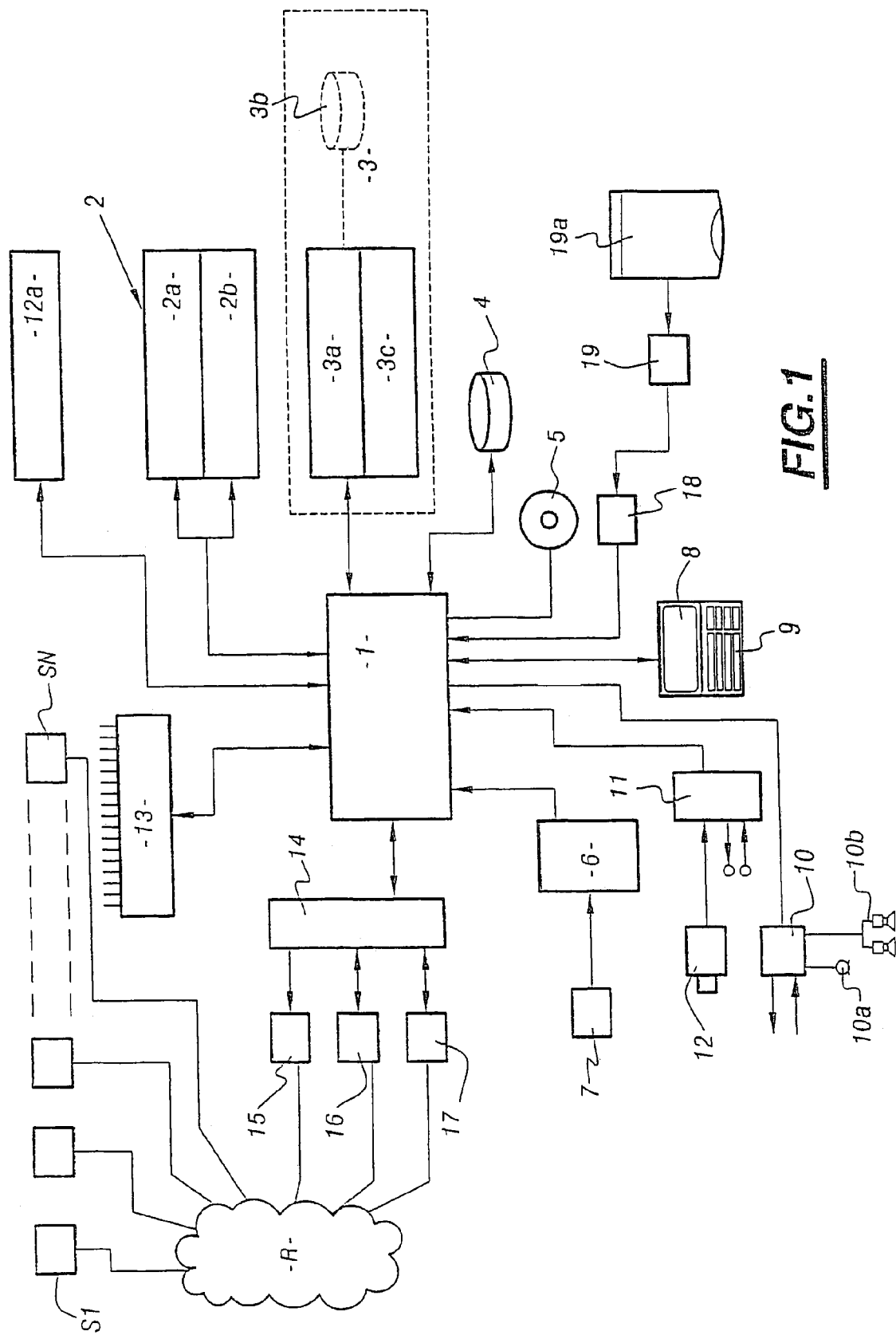
FIG. 1 is a schematic diagram of an appliance according to the invention.

The apparatus or terminal represented in FIG. 1 comprises a central unit 1 linked to a multipurpose memory unit 2 comprising RAM memory 2a and flash memory 2b and to a protected memory unit 3 comprising a permanent part in the form of flash memory 3a, of hard disk 3b or the like and a volatile part such as DRAM memory 3c.

The central unit is moreover linked to a disk 4 which may possible serve to retain the data or the programs relocated from said network.

The central unit 1 is moreover linked to a DVD or micro DVD reader and/or recorder 5, the role of which is either to read carriers of media available commercially, such as films, programs, etc., and/or to record all or some public and/or confidential information that has been captured in the protected memory 3 and that is stored on the disk, in encrypted manner by virtue of a chip card 7 reader 6 which constitutes an absolute means of identification.

The DVD reader and/or recorder 5 is a back-up facility.

It may be replaced by a magneto-optical reader or a hard disk, a diskette or any other medium. It is also possible to back up onto the network.

The reader 6 consists of contacts and of an electronic controller (not represented) capable of talking to the chip card 7.

The chip card 7 contains information that can be accessed either publicly or solely through one or more entitled entities.

This information includes:

the access providers for one or more networks and the associated information, domain name servers (DNSs), gateways, etc.;

a unique, individual key associated with each user;

information relating to the hardware and configurations used;

personal information such as a personal directory, a diary, bank details, etc.

The central unit 1 is furthermore linked to a display 8 for example an ultra-flat display of LCD or organic fluorescent polymer or like type, provided with a screen for example a screen with touch sensitive surface 9 of resistive, capacitive or like type.

The central unit is moreover linked to a stereo or mono sound input/output interface controller device 10. With the controller 10 are furthermore associated a microphone 10a and loudspeakers 10b. The central unit is moreover linked to a video input/output interface controller 11 to which is moreover connected a microcamera 12.

Data compression/decompression means 12a are moreover provided.

The compression/decompression means are likewise linked to the central unit 1.

The terminal furthermore comprises a controller 13 for universal computerized inputs/outputs allowing it to be linked on the one hand to peripherals and on the other hand to the network.

The computerized Inputs/Outputs to which the appliance can be connected are for example:

USB type 1, 2 or the like

IEEE 1394 dubbed "FireWire"

IEEE 802.3 dubbed ETERNET

IEEE 802.2 and others

The device also comprises a controller 14 for managing accesses to analogue or digital networks such as the network R on which are available sites S1 to Sn for storing data and applications intended to contribute to the formation of the operating environment of the terminal.

The controller 14 serves to drive various interfaces such as an infrared interface 15, a wire interface 16, an HF interface 17, etc.

The device is supplemented with a controller 18 into which is plugged an input/output interface 19 for a scanner 19a.

Figure 2:
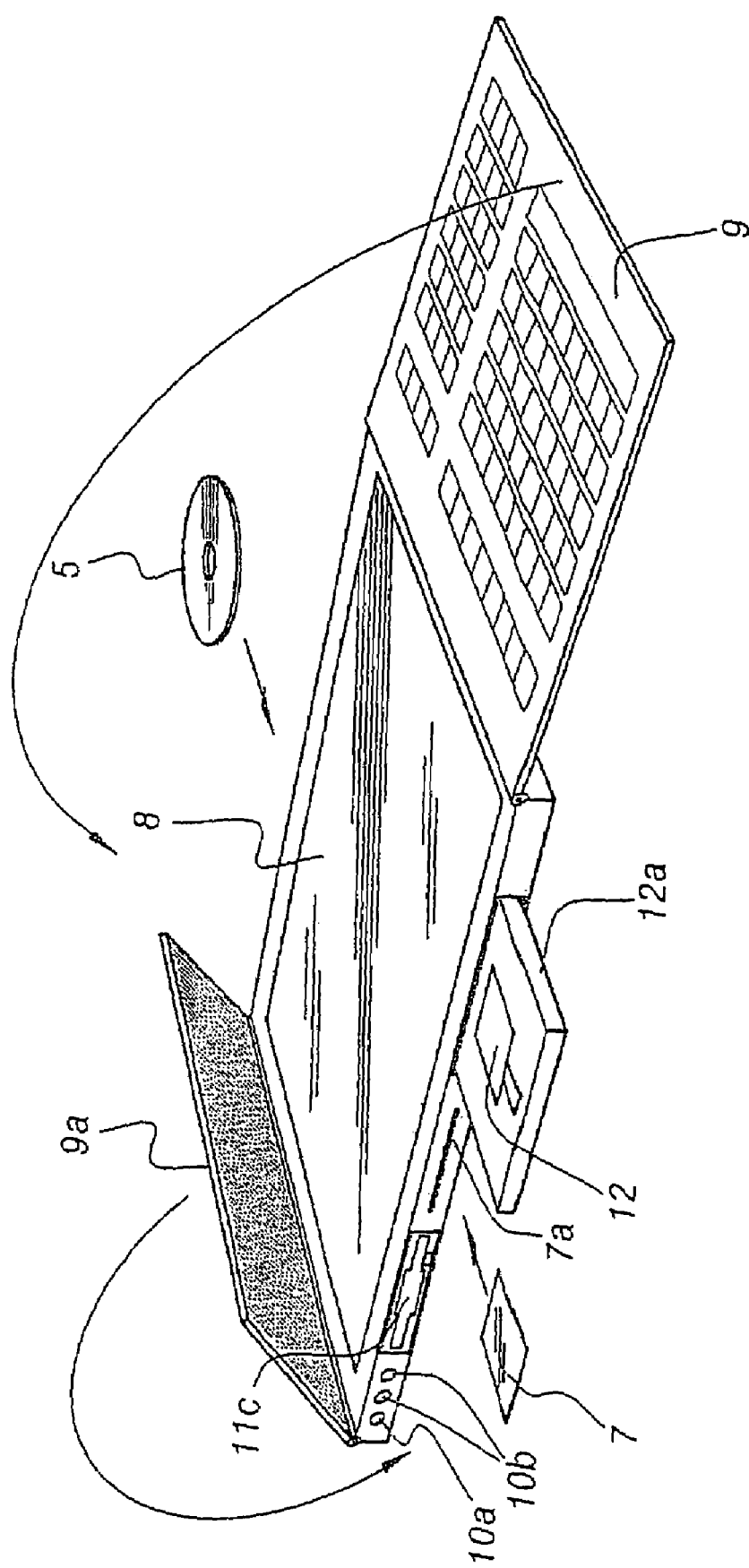
FIG. 2 is a perspective diagrammatic view of an appliance of portable type according to the invention.

According to an exemplary embodiment represented in FIG. 2, the terminal according to the invention comprises a liquid crystal screen 8 with sensitive surface, behind which are housed on one side a DVD reader/recorder 5 with slot insertion, then four USB connectors and two IEEE 1394 connectors (not represented). With the screen 8 is associated a keyboard 9 hinged with respect to the screen and that can be folded down onto the latter when it is not used. This keyboard is in this example of wireless type. A flap 9a which can also be folded down onto the screen 8 to afford protection thereto in cooperation with the keyboard 9 also serves as element for tilting the appliance in the usage position. On the other side are situated a video input/output in the form of a minijack 10a and an audio input/output 10b, a floppy disk reader 11c, a housing 7a for inserting an SIM card or chip card 7 and a microcamera 12 WEBCAM housed in a drawer 12a that can be opened or closed and even detached.

The terminal in its portable version comprises a battery and an extractable ultra-flat magnetic hard disk of for example 40 gigabytes (not represented).

The remainder of the elements such as the microprocessor, the memories and the like are arranged according to the diagram in FIG. 1.

Two versions of the terminal are envisaged for transport.

According to a first version, it comprises a lightweight but robust cover which completely covers the screen.

According to a second version represented in FIG. 2, it comprises two half-covers, one of which comprises a detachable or hinged keyboard.

A compact, chopped external supply (represented in FIG. 4) makes it possible to recharge accumulators which are of the quick charge type. In such a configuration, 12h of autonomous operation is obtained through a 1h 30 min recharge.

Figure 3:
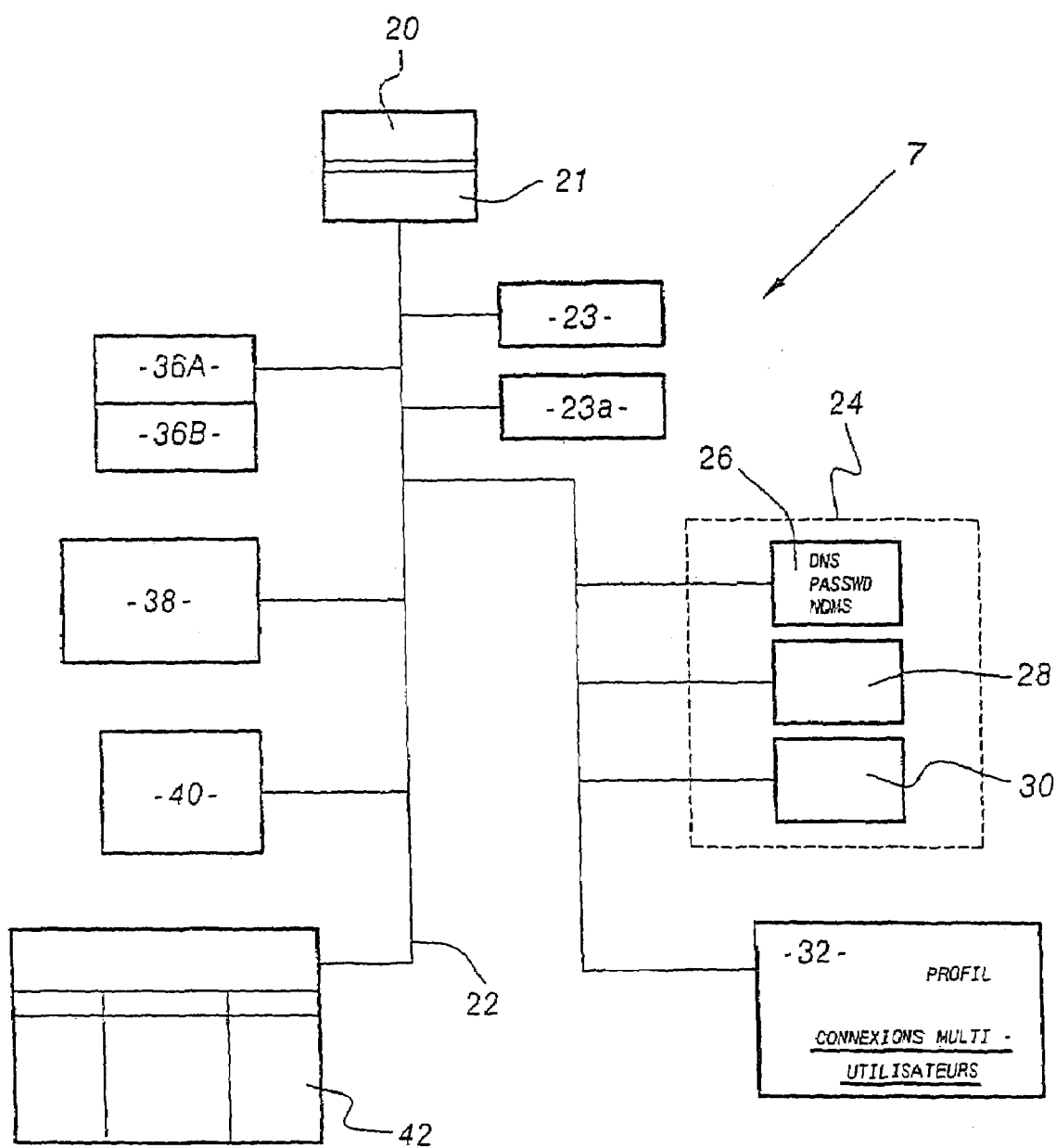
FIG. 3 is a schematic diagram of the electronic chip card of the device of FIG. 1.

FIG. 3 represents the schematic diagram of the chip card 7 of the device of FIG. 1.

The principal role of the chip card 7 consists in encrypting and decrypting all the data accessible to a given user and only to one who possesses such a means of identification.

By reason of this exclusivity of access, the coding can be performed legally on an almost unlimited resolution in terms of number of bits.

As far as the algorithms used for transporting the information over the network are concerned, they can use standard quantization in accordance with the legislation in force since they serve only to protect the transport of the information that is exclusive to a user.

The terminal according to the invention comprises for example encryption algorithms whose key is based on 1024 bits in respect of the exclusive information destined for users and can use any existing algorithm such as DES3, PGP, IPSEC, SSL, LDAP3 and the like both for the personal information and for the protection of transport on the network.

The chip card according to the invention comprises a fast serial input/output interface of for example greater than 1 Mbits/s and in any event greater than or equal to the bit rate for access to the network comprising a connector 20 linked to the chip card reader 6 represented in FIG. 1 and a controller 21 linked to a bus 22 to which are linked a microprocessor 23, means 24 of storing information personal to the user in particular at least one URL 26, an ISP Internet service provider 28, means 30 of storing private and other personal telephone numbers.

The storage means of this chip card consist for example of memory of flash type, which can store information indefinitely, without resorting to a supply source and hence without consuming energy.

Its microprocessor and also the width of its bus may be of the 8, 16, 32 bits or more type.

In the example considered, the Flash memory has a capacity of 32 megabits.

The information associated with the access provider furthermore comprises the addresses of the Internet service providers, a domain name server DNS, passwords PASSWD, login names.

To the bus 22 is furthermore linked a system 32 for determining the configuration in which the user wishes to operate the device.

The system 32 comprises a table storing information on various working environment profiles.

Several profiles can be managed by the user. For example a configuration may be a domestic configuration, an office configuration or the like.

The system 32 also stores the information regarding connection with the network, the access provider, and the like.

The bus 22 is furthermore linked to a memory 36a for algorithms for computing the encryption key and which may either be hard-wired or loaded into ROM memory or Flash memory, or be embodied in the form an optionally reloadable program for generating identification codes and confidential information. Anthropometric data can be incorporated with these codes. Advantageously, the encryption key incorporates for example parameters relating to the user's signature.

To the key computation program is added an encryption/decryption program 36b that makes it possible to encrypt all the data exclusively accessible to the user.

The computational power of the algorithms is improved by virtue of the addition to the microprocessor 23 of a customized coprocessor 23a.

Each user's keys are stored in a memory 38.

The bus 22 is moreover linked to a multi-user management system 40 making it possible to render the chip card usable by several entitled persons. These entitled persons, by virtue of their degrees of entitlement, which may be different, can access applications that the terminal or the network are capable of providing.

Finally, the bus 22 is linked to a system 42 for storing indications of the programs installed in the terminal, these programs being downloaded into the terminal or, when they are not downloaded, being available on the network and defining the environmental profile of a specified user.

The terminal according to the invention also comprises a device for controlling its supply which will now be described with reference to FIG. 4.

Any conventional microprocessor operates with a clock which paces all its operations and is also supplied with electrical energy by a supply source.

By design, to a given frequency delivered by the clock generator there corresponds an ideal supply voltage.

From this one concludes that for a maximum frequency of any processor whatsoever there corresponds an optimum voltage.

The general principle of operation of a microprocessor is that its associated program can allow the processor to compute the necessary resources in terms of instructions that it uses in the course of a given period of time.

In certain cases, anticipatory processes (pipelining, caching, etc.) make it possible to forecast the necessary power in advance.

It follows that the requirements in terms of processing power of a microprocessor can be ascertained at any instant.

These requirements may then be forwarded to a specialized unit which will meter on the one hand the pace of execution of the instructions and on the other hand the processor's supply sources, the whole in such a way that it operates at 100% viewed from outside.

In a microprocessor, it is generally the core or kernel that consumes the major part of the energy.

The term core designates the main computation unit and all its associated cache memories.

The higher the working frequency of a processor, the greater its energy consumption.

The device according to the invention makes it possible to adapt the working frequency and hence the energy that it must receive from its supply means as a function of the instantaneous computational power demanded of it.

Figure 4:
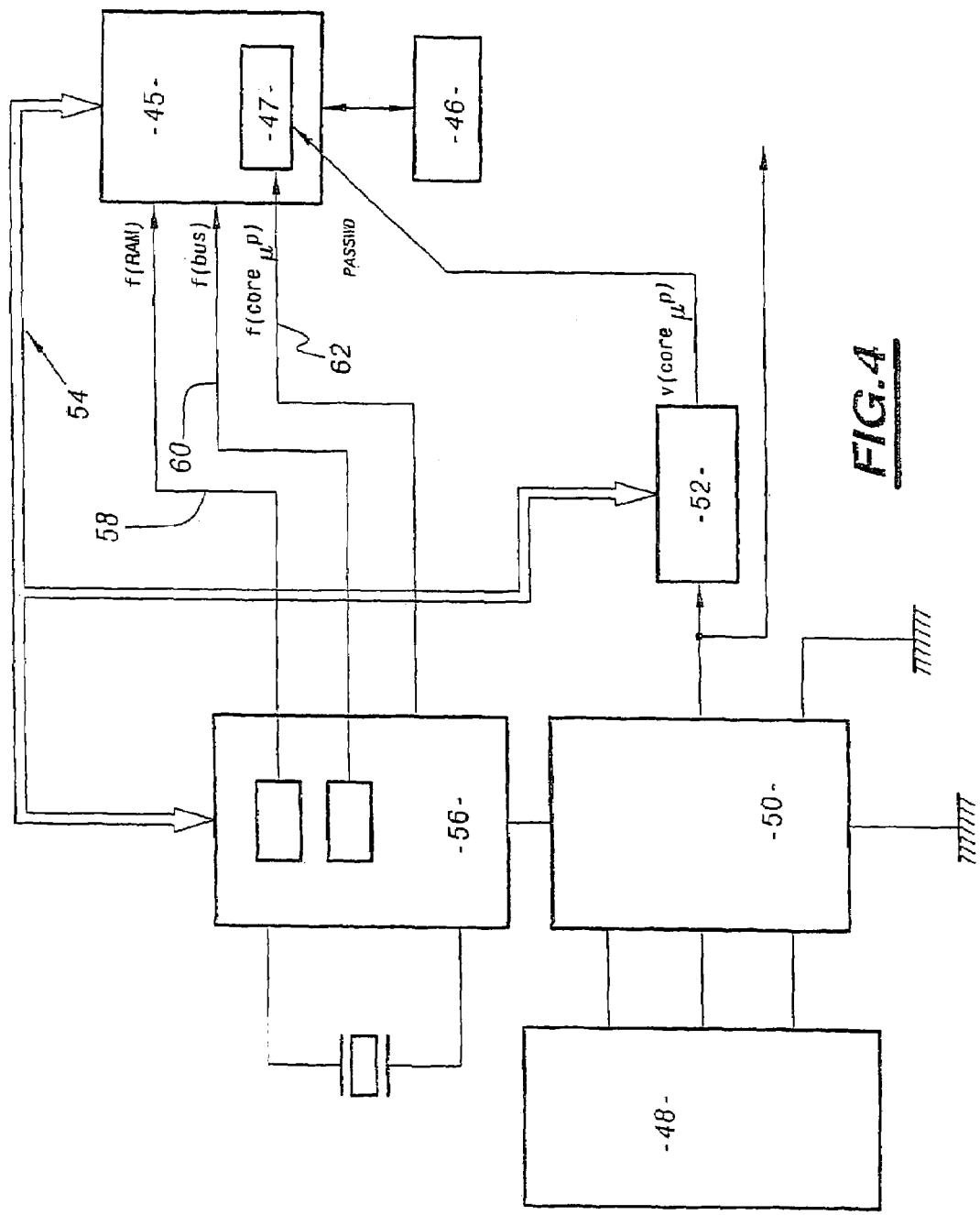
FIG. 4 is a schematic diagram of the means of control of the energyconsumption of the appliance according to the invention.

FIG. 4 represents such a device which comprises a processor 45 which is for example the processor of the central unit 1 of the device of FIG. 1, to which is connected a RAM memory 46 in which is stored software relating to the tasks to be executed by the processor.

The processor 45 comprising a core or kernel 47 is linked to a supply source 48 such as a portable computer battery or an office computer supply source by way of a fixed-voltage converter 50 and of a programmable-voltage converter 52, the voltage varying as a function of the requirements of the processor 45.

A control bus 54 furthermore links the processor 45 to the clock signals generator 56 and to the programmable converter 52 and also to the generator 56 via links 58, 60, 62 for transmission to the generator of signals of frequency corresponding to the speed requirements, of the RAM 46, and of the kernel 47 of the processor 45 and possibly of its associated cache memory.

At each instant, one of the tasks of the processor 45, stored in the memory 46, evaluates the energy requirements of the system as a function of the other tasks to be accomplished, stored in the memory 46.

The processor 45 asks the clock generator 56 for signals of frequency f(RAM), f(Bus), f(Core μP) which are dependent on the instantaneous energy requirements.

The bus 54 also sends the programmable converter 52 control signals for the voltage V(core μP) to be generated as a function of the signals originating from the processor 45.

Voltages which are controlled by the energy evaluation system composed of the bus 54 and of the processor 45 are delivered to the programmable converter 52 by the converter 50 supplied by the source 48.

The generator 52 delivers a variable voltage, varying for example between 0 and 5 V as a function of the evaluated requirements of the processor.

Since in the main, during average use a regular user invokes scarcely 10%, or even much less of the maximum power of a processor of the PC that he is using, by virtue of the device for regulating frequency 45, 56 and voltage 45, 52, an energy saving is made which allows at least a tenfold increase in the autonomy of the terminal according to the invention.

A portable PC of conventional type consumes energy that varies in only small proportions and in any event never by a ratio of greater than 50% of the maximum power of its processor.

On the other hand, the device according to the invention allows this proportion to be varied by an amount of at least 1000.

The generator 52 can be of the chopped pulse width modulation type or of any other high-efficiency type.

The manner of operation of the device described with reference to FIG. 1 is as follows.

It is assumed firstly that the device is new and has never been used, for example when purchased by a user.

Figure 5:
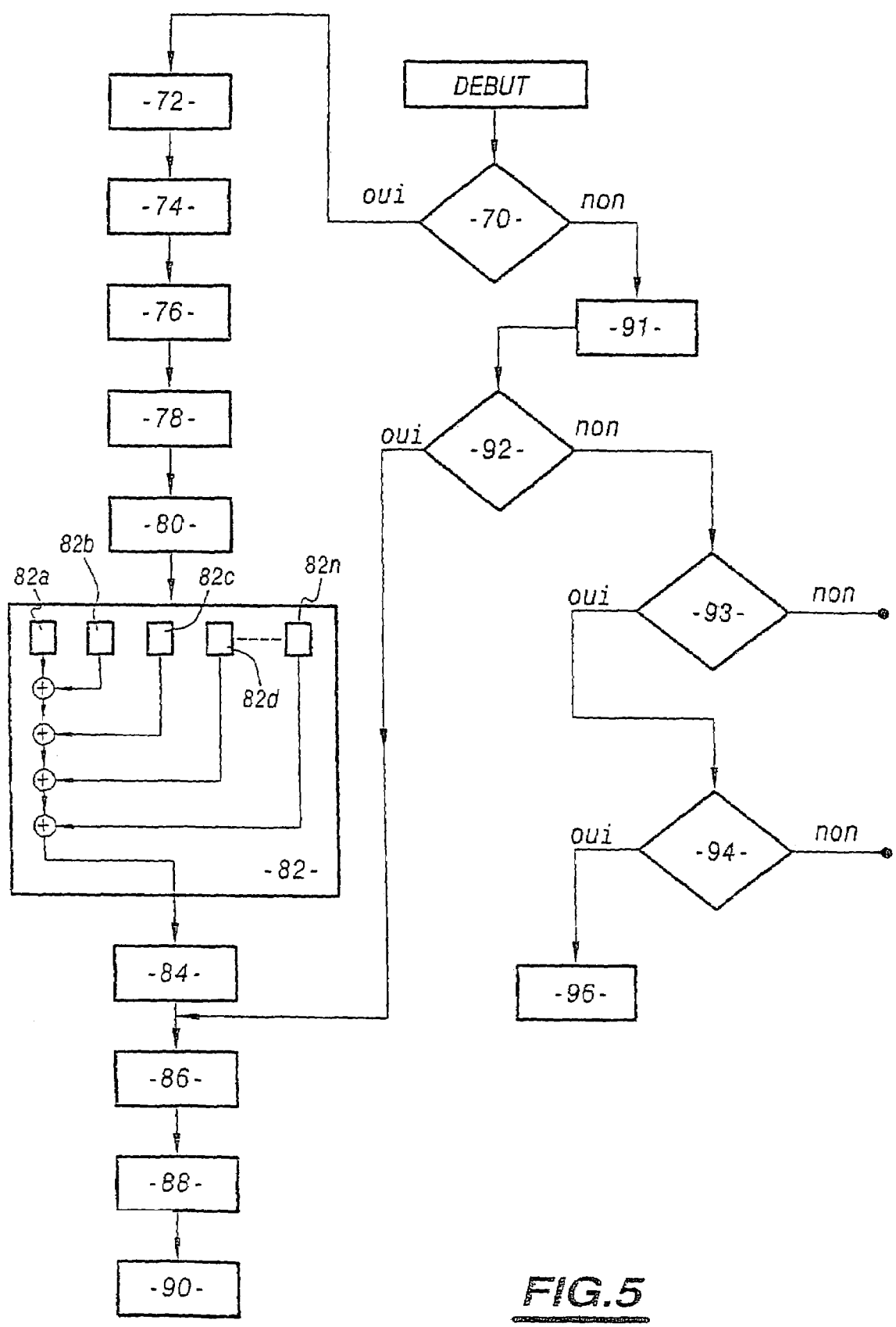
FIG. 5 is a flow chart showing the manner of operation of the appliance of FIG. 1.

In the course of step 70 of the flowchart of FIG. 5, the question is asked as to whether this is a first usage.

If it is, we go to step 72 for the choice of network provider, then to step 74 for the choice of subscription, and to step 76 for the choice of mode of payment.

We then go to step 78 for telling the provider the identity of the user.

In the course of step 80, the user then receives a personal management and identity chip card 7.

This chip card is personalized with the aid of personal information relating to the user in the course of step 82 where the chip card 7 is inserted and then the user's secret code is input into the terminal with the aid of the keyboard and/or of the touch screen 9 (FIG. 1) in the course of a step 82a and may possibly be associated with other means of identification such as for example a signature entered on the touch screen 9, in the course of a step 82b, the user's voice print input in the course of a step 82c by virtue of the microphone 10a incorporated into the terminal or else a fingerprint analysis input in the course of a step 82d by the terminal's micro video camera 12 with which is associated a support for the finger of the user (not represented) or their combinations.

Other inputs of parameters may also be carried out in the course of steps such as 82n by hooking up appropriate peripherals (not represented) to the terminal.

From these inputs are derived, by virtue of specific algorithms for shape recognition, coefficients which are then mixed with the user's secret code so as to be used by the algorithm 36a for computing the encryption/decryption key.

In the course of step 84, the usage chooses an algorithm from the available, public or private, known algorithms.

At this moment, the chosen algorithm computes the key which will determine the encryption and the decryption of all the information exclusively accessible to this user.

The encoding carried out by the personalization chip is used only by the user for the purposes of being able to store and read out his own data in his terminal and/or in the network at the premises of one or more access and/or service providers.

It is not therefore bound by the regulations limiting the size of the coding keys.

This coding can consequently be rendered tamper-proof by choosing keys with an unlimited number of bits.

In the course of step 86, the terminal links up to the chosen network.

It exchanges data, encrypted or otherwise, with the access provider according to standard protocols.

In the course of step 88, the access provider asks the terminal to forward it its configuration.

In the course of step 90, the access provider sends the terminal the software kernel of the operating system corresponding to this configuration and which will make it possible to manage the terminal. This software is then stored in the memory 2a or 2b of the central unit 1.

For obvious practical reasons, this software kernel is sent compressed, auto-extractable and executable on its arrival in the terminal.

The software kernel of this operating system, loaded into the protected or unprotected memory of the terminal, is a non-proprietary collection made up of modules available worldwide, such as Linux, QNX, OS9, GNU, FSF, JAVA or the like and assembled specifically for the architecture of this terminal.

Once the kernel has been stored in memory, it is executed and analyses the hardware and the peripherals of the terminal, then asks the access and/or service provider to send it the graphical, audio visual and other management software corresponding to this terminal.

The latter is also sent to it in compressed, autoextractable form.

These operations having been performed, the network offers via the access and/or service provider, the menu of all the available applications.

The display management software used for this implementation is for example XFRee 86 which includes the X WINDOWS graphics manager, the whole collection being public and free of charge, thereby allowing them to be downloaded by the network in the course of this operating step of the terminal.

The only resident software common to all the terminals before any connection to the network is a small condensed software module, for example the boot_p version of linux also available for free.

The kernel and all the software are downloaded and will be updated automatically without prejudice or modification in respect of the user, in absolutely transparent manner, sheltering the appliance or its upgrades from obsolescence. The only constraint for the user with this type of terminal is that of having to organize the access connection in particular to at least one access and/or service provider.

The DVD or micro DVD reader 5 can make it possible to introduce complementary packages.

In one of the implementations, it is also a writer and therefore allows the encrypted or unencrypted saving of user-personal information or the like. If the recording is encrypted, it is then compulsory to use the means of identification 6 and 7 to read it out.

If the terminal does not possess any DVD reader or other means of storage, the user then employs the other means at his disposal such as: the network, the floppy disk, the protected memory, etc. It will then be compulsory for him to use the means of identification 6 and 7 to read them out.

Coming back to the flow chart of FIG. 5, if the response to the query in step 70 is negative signifying that the use of the appliance is not the first usage in the course of step 91, the user inserts his personal encryption/decryption chip card 7 into the machine and enters his secret code for example via the keyboard 9. In another application, he enters his secret code by voice with the aid of the microphone 10a (FIG. 1).

Two situations may then arise:
a) the user is the same as the one for which the first usage was effected or else one of the users given entitlement by the multi-user management system 40,
b) the user is a user other than the one for which the first usage was effected and has therefore inserted a different chip card from that of the first user.

We go to step 92 in the course of which we ask whether the terminal is linked or can be linked to the network.

If not, in the course of step 93 we ask whether the user who has inserted his chip card is the same as the first user or not.

If the response to the question posed in step 92 is yes, we go directly to step 86 for linking up with the network whoever the user of the terminal may be.

If in step 93 it is determined that the user is the same as the first user of the terminal or else that he is one of the entitled users, we go to step 94 in the course of which we ask whether the terminal contains previously downloaded applications.

If in step 93 it is established that the user is different from the first user, the confidential data and the configuration of the terminal in its form when not linked to the network cannot be used by this new user.

If in the course of step 94 it is established that the terminal contains previously downloaded applications, the user who is the same as the first user or who is one of the entitled users, can in the course of step 96, as a function of his degree of entitlement, use the applications downloaded into the terminal.

However, if there are no applications downloaded into the terminal, data may be kept there permanently.

Thus, when the user is different from the first user, the network will configure itself so as to comply with the characteristics corresponding to the key of this other user who will then regain his own environment, without necessarily loading the packages into the terminal.

If the terminal cannot be linked to a network, the other user will not have access to any of the applications downloaded by the first user unless they are authorized by the proprietor of the terminal.

A feature of the terminal according to the invention is that it automatically downloads the applications which the user may require and which are affiliated with all the types of data that are present, such as sounds, data, pictures, animations, vector graphics or pixelized graphics, etc, During a usage N, it is possible to read the information already recorded in the course of the previous usages, by virtue of compact minimal modules which load automatically into nonprotected memory 2 or 4 (FIG. 11)

The terminal according to the invention is updated at each usage with link to the network from which it receives all the resources necessary for its operation, in their updated versions.

The arrangement of the invention allows the virtual usage of a terminal via another terminal by virtue of the specific chip card of the invention.

The chip card makes it possible to use a terminal comprising at least one chip card reader.

Furthermore it makes it possible to regain in a terminal located anywhere in the world the environment of the user such as it was created with the aid of his own terminal.

By virtue of the chip card 7, the user of a terminal located at a point remote from his terminal can furthermore read the content of his own terminal if the latter is connected or connectable on standby to the network. In this case, the data stored in the network are of course accessible on said remote terminal.

The terminal according to the invention keeps the permanent data either in the flash type memory 3a, or in a part of the hard disk 4, access to whose data has been encrypted by the chip. It is important to note that it is the personal chip card that encrypts and not the central unit. Indeed, this characteristic alone of the invention renders the encrypted data tamper-proof.

Another part of the user's personal information is storable at the access/service provider's premises. This is advantageous in the case of large volumes.

As indicated earlier, advantageously, the control unit comprises a device allowing it to change its computational power in particular through the clock frequency and/or the supply voltage as a function of the necessary data processing power.

One of the functionalities of the processor 45 (FIG. 4) makes it possible to compute the necessary processing power and to forward it via the bus 54 to the appropriate means for adjusting the voltage and/or the clock frequency.

The terminal according to the invention furthermore exhibits the following advantages:
  it is not dependent on any OS provider,
  no obsolescence,
  it relies essentially on a universal graphics display system which is free of all charges and is not based on an Internet display/navigator/browser of the HTML or XML kind, which it may moreover use if required.

it is designed at the outset to operate in affiliation with an analog and/or digital network, this not being the case for a PC which is designed to perform its operations strictly locally, in complete isolation, any links that it may have with the outside serving only to perform a straightforward exchange of data such as mail, documents, pictures or the like and which above all comprises no independent encryption/decryption means specific to a user.

The terminal according to the invention possesses a system making it possible to manage the functionalities in a manner which is totally transparent to the user who therefore no longer requires computing knowledge.

Among other possibilities, it allows confidential data, encrypted or otherwise, specific to the user, to be saved in a sealed part of its memory, reserved for this purpose.

The so-called "open" public management software for the appliance is located in a completely separate area 2a, 2b (FIG. 1).

The fundamental difference between the terminal according to the invention and a PC resides in the fact that the terminal comprises no complex management system such as the compulsory OS and installed redundant on conventional machines, but that on the contrary it incorporates a minimal standardized, free, public system allowing it to manage only its graphical display and the peripherals that it comprises with the exception of any large complex application that eats up memory space and computational resources, as is compulsory with current PCs and associated OSs.

Thus, the terminal according to the invention does not necessitate the periodic acquisition of a CD or some other update support for its own management software.

This appliance is therefore a terminal which is multipurpose from the outset, provided with simple, minimal functions reduced to the management of its own peripherals.

One of the various modes of use of the terminal according to the invention will now be described hereinafter.

On purchasing the terminal, the user takes out a connection subscription with an access and/or service provider.

He is then given a means of identification for example in the form of a personal card or some other chip-based facility or "SIM type card" specific to the invention to be inserted into the appliance.

After its start-up phase, since this terminal is always on permanent standby by virtue of its energy saving system, it comes into action instantaneously without any loading period or warm-up period, this not being the case for a PC.

For the first usage, the means of identification having been inserted into the terminal, personalization of the user's environment is offered:

color/photo of the screen background(s), moving or otherwise, number and size of the virtual office windows, tailoring of the keyboard, touch sensitive or otherwise, main uses dedicated to this terminal, optionally a few items of personal information to be entered, such as address, telephone, etc.

After this brief sequence, the user can at his leisure choose from the multitude of packages that are automatically displayed on the screen 8 (FIG. 1) originating from the network.

He can then decide, in virtual windows at his disposal, for example, to watch this or that television channel, while consulting the stockmarket "live" and preparing a text to be sent.

The user can also decide to store some of this information locally in his terminal, and it then becomes personal.

He can also decide to store this information in a user space which is reserved specially for him at his access provider's via the network and which he will be able to consult when it seems right to him.

This information may be a film, a picture, a text or the like. It may be stored either at the access provider's, or in the terminal if this information is of sufficiently small volume.

The user is also furnished with means allowing his terminal to file away and retrieve, instantaneously, all the information which he has stored locally or at his access provider's.

The terminal according to the invention is connected in a minimal but permanent manner for example on standby to an analog or digital network.

This characteristic alone diverts the PC and any conventional terminal to a completely different use.

Specifically, with a conventional PC, the typing of a text for example calls upon text processing software stored in the machine.

The same holds for all other packages that must necessarily be housed in the PC.

By virtue of the characteristics of the terminal according to the invention, the user is furnished with at least two possibilities for performing these operations depending on whether or not he can connect up to the access provider.

If he cannot connect up, he uses a small minimal routine previously downloaded into the terminal from the network, for example a text processing routine.

If he can connect up, he uses only the display powers of his terminal, the package used then being provided by the network.

The user can then choose from these two modes of operation the one which seems to him most appropriate:

If the computational power requested is low, he can then download the corresponding routine into the terminal and perform the operations in situ.

If the computational power requested is considerable, he can then rent the service of a corresponding package on the network, and only the results of the processing are observed on the screen of the terminal. The user can in this case decide for example to leave the data computed at the application provider's, thereby avoiding the need for a large transfer of information.

It is thus possible, by virtue of this latter mode of operation of the terminal, to obtain sizable computational power since the computers to which the terminal will be able to connect are not subject to any limit in terms of size, weight, consumption, etc.

Thus, the terminal according to the invention has almost infinite computational power at its disposal.

The bill for the remote service or services is invoiced in any possible manner, by subscription, flat rate or the like.

The terminal according to the invention can furthermore be used as a virtual video recorder.

For this purpose, it suffices for the user to select a television program and for him to connect his sound interface 10 and video interface 11 (FIG. 1) up to a standard television and a standard HIFI deck in order to benefit from the quality of these items of equipment.

The selected signals of the television program are received by the network management circuit 14 and are routed after processing by the central unit 1 and decryption/decompression, if any, to the sound and video interfaces 10 and 11 and finally, to the television and HIFI deck (which are not represented).

Likewise, the video microcamera 12 and the microphone 10a which are integrated into the terminal allow it to perform inverse operations such as video conferencing, video surveillance, etc.

By virtue of the identification system and the algorithms contained in the chip card 7 of the user, the latter can purchase or order directly the products offered by the network and that the user can display on the screen 8.

When not connected to the mains, the terminal of the invention can run autonomously, during uninterrupted maximum usage, for at least 12 hours, by virtue of its power-metered mode of operation described with reference to FIG. 4 which allows it to work at its maximum computational power as for a PC but also at computational power metered in proportion to the requirements.

This is a very important characteristic of this terminal since it is by virtue of its internal microcode which allows it to provide the necessary information to the processor of its central unit 1 so that it automatically adapts its clock frequency and/or its voltage of usage to the computational power requested.

The terminal can thus remain on permanent standby since the personal information that it holds does not demand energy consumption.

One of the main characteristics of the terminal according to the invention is the role played by the means of identification of its user.

The user can work with the terminal only with his means of identification inserted into the terminal.

Without this means, the terminal is reduced to a simple screen that can be used with very simple authorized public applications that make it possible for example to consult/process unprotected data.

If for any reason whatsoever the user is induced to interrupt his work and resume it elsewhere on another terminal according to the invention, it suffices for him to withdraw his means of identification, to go to the other terminal and to insert the means of identification into it.

This other terminal then instantaneously regains the same environment as that left on the initial terminal.

The terminal according to the invention can also operate connected to a local or private network that it can then use as applications provider, i.e. as gateway to its own provider.

It is therefore apparent that the terminal according to the invention makes it possible to achieve new and numerous fundamental objectives among which may be mentioned the following:
a) absolute mobility since any terminal whatsoever of the invention makes it possible to perform the same operations,
b) almost unlimited computational power,
c) absolute confidentiality of the information belonging to a user by virtue of the presence of the means of identification and of the means of encryption,
d) the possibility of having oneself identified remotely, this allowing all types of transactions, free of cost or otherwise, for example buying, selling, paying games, and the like,
e) a high degree of autonomy rendering this terminal utilizable in a viable manner,
f) by virtue of the personal chip, absence of obsolescence even if the terminal is upgraded.

The terminal according to the invention can have numerous applications among which may be mentioned the following:
television and/or audiovisual program receiver,
audio visual sequence transmitter,
remote video and/or sound surveillance,
mobile telephone,
videophone,
high-quality digital audio receiver and/or broadcaster on several channels,
personal diary that can be consulted remotely by virtue of the means of identification,
GPS, with communication of its position to the network to which it is linked and therefore to any approved user who has access to the network. This is made possible also by virtue of the fact that the terminal can be located by transmitter/receiver stations, termed outposts or relays, which allow access to the network, or by adding a standard GPS module connected as peripherals of the terminal.
any application: office scientific, Computer Aided Design, Computer Aided Drawing, medical, or other tasks which may call upon appreciable computational power.

All this is made possible by virtue of the extremely simplified characteristics of the terminal according to the invention which is essentially merely a graphics display linked to a bidirectional network and provided with its identification module.

One of the fundamental characteristics of the terminal operating according to the invention is that it possesses a graphics display which is able to automatically recognize all types of data such as: pictures, films, texts, logos, sounds, etc. or their combinations, thus allowing the user to decide on their utilization.

The invention claimed is:

1. A terminal for displaying, retrieving, inputting and processing data for user comprising:
a graphics display central unit configurable as a virtual terminal; and
an identification module for identifying at least one authorized user and establishing, for the one user, a specific operating environment on the central unit based on stored information specific to the one user,
the central unit comprising a memory unit connected to a processor, a memory unit for applications to be implemented by the terminal, communication means to communicate with at least one network for linking with at least one access/services provider, at least one interface for linking with at least one peripheral, a screen, a keyboard, an energy supply means, a memory unit with confidential access for the personal data of at least one user, and a reading means for reading the identification module,
said identification module being removably insertable into the reading means and comprising a processor, means of storing data identifying said at least one user, means of generating for each user a data encryption/decryption key, means of encryption/decryption, means of configuring the terminal as function of the requirements of each user in terms of applications available on the network, wherein,
the identification module of the one user can be withdrawn from the central unit and inserted into another central unit to allow the one user to recreate in the another central unit the specific operating environment created for the one user in the central unit and thus to transform the another central unit, while containing the identification module of the one user, into a virtual terminal for the other user,
the encryption/decryption means by cooperating with said key identifies the one authorized user and initially establishes the specific operating environment on the central unit based on the stored information pertaining to the one authorized user, by encrypting and decrypting data and/or applications exchanged between the network and said user and/or the data and/or the applications contained in the memory unit with confidential access to create the specific operating environment transferable between the central unit and another central unit based on the stored information pertaining to the one user and so as to recreate the created specific operating environment of the one user, as defined at the time the one user removes the identification module from the central unit, on the another central unit.

2. The terminal as claimed in claim 1, wherein, the stored information, pertaining to the one user as defined at the time the one user removed the identification module from the central unit, is stored on the one network by the one access/services provider, and inserting the identification module into the another central unit causes the another central unit to access the stored information, pertaining to the one user, from the one access/services provider, the accessed stored information from the one access/services provider being used to recreate, on the another central unit, the specific operation environment of the one user as defined at the time the user removed the identification module from the central unit.

3. The terminal as claimed in claim 1, characterized in that the information identifying said at least one user comprises the surname and forename, the address of the user, as well as the bank details of the user.

4. The terminal as claimed in claim 1, characterized in that the identification module identifying said at least one user comprise a personal chip card insertable into a chip card reader and the keyboard associated with said screen with a view to the entry of the personal code of each user.

5. The terminal as claimed in claim 1, characterized in that said encryption/decryption means are carried by the personal chip card.

6. The terminal as claimed in claim 1, characterized in that the chip card comprises a controller linked to a bus to which are linked the processor, the means of storing the data personal to the user, a system for determining the configuration in which the user wishes to operate the device, a modifiable algorithm for computing the key for encrypting/decrypting the data and/or the applications exchanged between the terminal, the network and the storage unit with confidential access.

7. The terminal as claimed in claim 6, characterized in that it comprises additional means of identifying the user through the latter's anthropometric information and means of combining parameters corresponding to said anthropometric data with the data used by the algorithm for computing said encryption/decryption key.

8. The terminal as claimed in claim 6, characterized in that said personal chip card furthermore comprises linked to its bus, a multi-user management system making it possible to render the chip card usable by several entitled persons.

9. The terminal as claimed in claim 8, characterized in that the degrees of entitlement of the users are different and make it possible to access applications that the terminal is capable of providing and which are authorized by the degree of entitlement of the corresponding user.

10. The terminal as claimed in claim 6, characterized in that said personal chip card furthermore comprises linked to said bus, a system for indicating the programs installed in the terminal, these programs being downloaded into the terminal or available on the network to which said terminal is linked and thus defining the environment of a specified user.

11. The terminal as claimed in claim 1, characterized in that it comprises associated with the central unit, input/output interfaces for the audio signals, for the video signals and for a scanner.

12. The terminal as claimed in claim 1, characterized in that the means of communication with said at least one access provider network comprise a controller linked to the central unit and to which are linked an infrared, a wire interface and a high frequency interface.

13. The terminal as claimed in claim 1, characterized in that in furthermore comprises a controller of universal computerized inputs/outputs allowing it to be linked to peripherals and to the network.

14. The terminal as claim in claim 1, characterized in that it furthermore comprises a device which meters its energy supply means and its working frequency as a function of its instantaneous computational power which is necessary for it.

15. The terminal as claimed in claim 14, characterized in that said energy adaptation device comprises linked by a bus to the processor of said central unit, a clock generator and a fixed voltage converter, connected to an electrical supply source of fixed Voltage, said fixed-voltage converter being in turn connected to a programmable-voltage converter controlled by the processor and supplying the kernel of the processor, said clock generator being furthermore linked to the processor in such a way as to supply the latter with the signals of frequency f(RAM), f(bus), f(core µp) corresponding to the computational power requirements of the RAM memory associated with the processor and of the kernel of said processor.

16. The terminal as claimed in claim 1, characterized in that the applications, on the one hand exchanged between the network and said user, and on the other hand stored in the terminal are of the free software type.

17. The terminal as claimed in claim 1, characterized in that associated therewith is at least one site for storing data and/or applications which belong to said at least one network and which are intended to contribute to the formation of the operating environment of the terminal including the site sending the terminal the software kernel of the operating system corresponding to the operating environment of the terminal, the kernel becoming active in the terminal and requesting the one site send graphical, audio visual and management software corresponding to the terminal and the operating system.

18. A terminal for displaying, retrieving, inputting and processing data for user comprising:

a graphics display central unit configurable as a virtual terminal; and an identification module for identifying one authorized user and establishing an operating environment on the central unit specific to the one user, the specific operating environment being based on information specific to the one user stored at a network access provider, the central unit comprising a processor, a memory unit for storing an operating system and applications to be implemented under the operating system, and a reader for reading the identification module, the identification module being insertable into the reader and comprising a processor, storage for storing data identifying the one user, a means of generating for the one user a data encryption/decryption key, a means of encryption/decryption, and a means of configuring the central unit to the specific operating environment by retrieving the stored information specific to the one user from the network access provider, wherein, upon inserting the identification module into the reader, the encryption/decryption means by cooperating with said key identifies the one user and creates the specific operating environment within the central unit by i) initially retrieving the stored information specific to the one user from the network access provider to ascertain a last operating environment of the one user including the operating system and applications previously stored in the memory unit, ii) requesting from the network access provider, a software kernel of the operating system corresponding tot he last operating environment, and iii) upon the kernel becoming active in the central unit, requesting the network access provider send graphical, audio visual and management software corresponding to the central unit and the operating system, and the identification module can be withdrawn from the central unit and inserted into another central unit to allow the one user to recreate in the another central unit the specific operating environment created for the one user in the central unit and thus to transform the another central unit, while containing the identification module of the one user, into a virtual terminal for the one user by identically recreating the specific operating environment of the one user, as defined at the time the one user removes the identification module from the central unit, on the another central unit.

* * * * *